United States Patent
Cho et al.

(10) Patent No.: US 9,997,919 B2
(45) Date of Patent: Jun. 12, 2018

(54) APPARATUS AND METHOD FOR OPERATING DISTRIBUTED GENERATOR IN CONNECTION WITH POWER SYSTEM

(71) Applicant: KOREA ELECTRIC POWER CORPORATION, Seoul (KR)

(72) Inventors: Seong Soo Cho, Daejeon (KR); Won Wook Jung, Daejeon (KR); Il Keun Song, Daejeon (KR); Sang Ok Kim, Daejeon (KR); Joon Ho Choi, Gwangju (KR)

(73) Assignee: KOREA ELECTRIC POWER CORPORATION, Seoul (KR)

( * ) Notice: Subject to any disclaimer, the term of this patent is extended or adjusted under 35 U.S.C. 154(b) by 363 days.

(21) Appl. No.: 14/781,300

(22) PCT Filed: Sep. 27, 2013

(86) PCT No.: PCT/KR2013/008662
§ 371 (c)(1),
(2) Date: Sep. 29, 2015

(87) PCT Pub. No.: WO2014/208816
PCT Pub. Date: Dec. 31, 2014

(65) Prior Publication Data
US 2016/0072290 A1 Mar. 10, 2016

(30) Foreign Application Priority Data
Jun. 28, 2013 (KR) ........................ 10-2013-0075242

(51) Int. Cl.
*G05D 3/12* (2006.01)
*H02J 3/38* (2006.01)
(Continued)

(52) U.S. Cl.
CPC .............. *H02J 3/381* (2013.01); *G05B 15/02* (2013.01); *H02J 3/24* (2013.01)

(58) Field of Classification Search
CPC .. H02J 3/16; H02J 3/18; Y02E 10/763; Y02E 40/34; Y02E 10/563; Y02E 40/72;
(Continued)

(56) References Cited

U.S. PATENT DOCUMENTS 4,680,691 A * 7/1987 Yoshino .................... H02J 3/36
363/35
5,187,427 A * 2/1993 Erdman ................ H02J 3/1842
323/207
(Continued)

FOREIGN PATENT DOCUMENTS

JP  2000-232736 A  8/2000
JP  2005-160188 A  6/2005
(Continued)

OTHER PUBLICATIONS

International Search Report issued in corresponding International Patent Application No. PCT/KR2013/008662, dated Mar. 31, 2014, 4 pages with English translation.

*Primary Examiner* — Darrin Dunn
(74) *Attorney, Agent, or Firm* — McDermott Will & Emery LLP

(57) ABSTRACT

An apparatus for operating a distributed generator in connection with a power system includes an input unit which receives a parameter calculated using power system information and a voltage and a current at a point of common coupling with the distributed generator, with which the distributed generator is connected, a calculation unit which calculates an operating power factor instruction value and an active output instruction value using the parameter and the voltage and current at the point of common coupling with the distributed generator input to the input unit, and a control
(Continued)

communication unit which determines and transmits the operating power factor instruction value and the active output instruction value according to the voltage at the point of common coupling with the distributed generator input to the input unit and an admissible voltage upper limit at the point of common coupling with the distributed generator to the distributed generator.

15 Claims, 13 Drawing Sheets

(51) Int. Cl.
*H02J 3/24* (2006.01)
*G05B 15/02* (2006.01)

(58) Field of Classification Search
CPC . Y02E 40/12; Y02E 40/16; G05F 1/70; H02P 2201/15; H02P 23/26; G01R 21/06; G01R 27/16
See application file for complete search history.

(56) References Cited

U.S. PATENT DOCUMENTS

| | | | | |
|---|---|---|---|---|
| 5,508,623 | A * | 4/1996 | Heydt | G01R 23/20 307/105 |
| 6,359,423 | B1 * | 3/2002 | Noro | H02J 3/12 323/207 |
| 6,392,856 | B1 * | 5/2002 | Kehrli | H02J 3/12 361/62 |
| 6,429,643 | B1 * | 8/2002 | Smith | G01R 21/06 324/103 R |
| 7,095,597 | B1 * | 8/2006 | Cousineau | H02J 3/1828 361/20 |
| 7,994,658 | B2 * | 8/2011 | Cardinal | F03D 7/028 307/84 |
| 8,290,634 | B2 * | 10/2012 | Larsen | H02J 3/16 290/44 |
| 8,716,888 | B2 * | 5/2014 | Watanabe | H02J 3/1885 307/42 |
| 8,823,192 | B2 * | 9/2014 | Bech | H02J 3/381 290/44 |
| 9,057,356 | B2 * | 6/2015 | Bech | F03D 9/005 |
| 9,110,481 | B2 * | 8/2015 | Strobl | F03D 7/0284 |
| 9,270,200 | B2 * | 2/2016 | Roscoe | H02M 7/53871 |
| 9,325,173 | B2 * | 4/2016 | Varma | H02J 3/01 |
| 9,377,803 | B2 * | 6/2016 | Watanabe | G05F 1/70 |
| 9,531,193 | B2 * | 12/2016 | Andresen | H02J 3/50 |
| 9,551,323 | B2 * | 1/2017 | Garcia | F03D 7/043 |
| 9,631,608 | B2 * | 4/2017 | Garcia | F03D 9/255 |
| 9,698,601 | B2 * | 7/2017 | Watanabe | H02J 3/18 |
| 2003/0227172 | A1 * | 12/2003 | Erdman | F03D 7/0284 290/44 |
| 2004/0030457 | A1 * | 2/2004 | Bayoumi | H02J 13/0062 700/286 |
| 2004/0114290 | A1 * | 6/2004 | Kehrli | H02J 3/06 361/84 |
| 2005/0040655 | A1 * | 2/2005 | Wilkins | F03D 7/02 290/44 |
| 2005/0075076 | A1 * | 4/2005 | Grun | G01R 21/001 455/67.11 |
| 2007/0182420 | A1 * | 8/2007 | Buda | B23K 11/241 324/522 |
| 2010/0025994 | A1 * | 2/2010 | Cardinal | F03D 7/0284 290/44 |
| 2010/0094474 | A1 * | 4/2010 | Larsen | H02J 3/16 700/287 |
| 2010/0195357 | A1 * | 8/2010 | Fornage | H02J 3/383 363/55 |
| 2010/0207460 | A1 * | 8/2010 | Walker | H02H 9/001 307/109 |
| 2011/0133461 | A1 * | 6/2011 | Hjort | F03D 7/0272 290/44 |
| 2011/0166716 | A9 * | 7/2011 | Rovnyak | H02J 3/38 700/287 |
| 2011/0285437 | A1 * | 11/2011 | Benchaib | H02J 3/1857 327/156 |
| 2011/0309683 | A1 * | 12/2011 | Nielsen | F03D 7/0284 307/84 |
| 2011/0313591 | A1 * | 12/2011 | Andresen | F03D 7/028 700/298 |
| 2012/0010756 | A1 * | 1/2012 | Larsen | H02J 3/16 700/289 |
| 2012/0130656 | A1 * | 5/2012 | Bickel | G01R 21/133 702/60 |
| 2012/0147506 | A1 * | 6/2012 | Hedquist | H02J 3/24 361/21 |
| 2012/0203385 | A1 * | 8/2012 | Kumar | H02J 3/26 700/287 |
| 2012/0205981 | A1 * | 8/2012 | Varma | H02J 3/01 307/64 |
| 2012/0261917 | A1 * | 10/2012 | Egedal | F03D 7/026 290/44 |
| 2012/0265586 | A1 * | 10/2012 | Mammone | G06Q 30/02 705/14.1 |
| 2012/0280673 | A1 * | 11/2012 | Watanabe | H02J 3/1885 323/304 |
| 2013/0002211 | A1 * | 1/2013 | Egedal | H02J 3/16 323/208 |
| 2013/0015660 | A1 * | 1/2013 | Hesselbæk | H02J 3/16 290/44 |
| 2013/0026756 | A1 * | 1/2013 | Andresen | H02J 3/50 290/44 |
| 2013/0051103 | A1 * | 2/2013 | Roscoe | H02M 7/53871 363/131 |
| 2013/0093186 | A1 * | 4/2013 | Arinaga | F03D 7/028 290/44 |
| 2013/0106196 | A1 * | 5/2013 | Johnson | H02J 3/1842 307/82 |
| 2013/0134779 | A1 * | 5/2013 | Watanabe | G05F 1/70 307/24 |
| 2013/0134789 | A1 * | 5/2013 | Panosyan | H02J 3/1835 307/84 |
| 2013/0161951 | A1 * | 6/2013 | Bech | F03D 9/005 290/44 |
| 2013/0200621 | A1 * | 8/2013 | Andresen | F03D 7/0284 290/44 |
| 2013/0249215 | A1 * | 9/2013 | Egedal | H02J 3/16 290/44 |
| 2013/0300118 | A1 * | 11/2013 | Bech | H02J 3/381 290/44 |
| 2014/0015250 | A1 * | 1/2014 | Teodorescu | F03D 7/0284 290/44 |
| 2014/0046500 | A1 * | 2/2014 | Varma | G05F 1/66 700/298 |
| 2014/0100705 | A1 * | 4/2014 | Shi | G06F 1/305 700/293 |
| 2014/0152010 | A1 * | 6/2014 | Larsen | F03D 7/00 290/44 |
| 2014/0191581 | A1 * | 7/2014 | Inuzuka | H02J 3/382 307/80 |
| 2014/0306534 | A1 * | 10/2014 | Shi | H02J 3/32 307/52 |
| 2014/0347020 | A1 * | 11/2014 | Strobl | F03D 7/0284 323/205 |
| 2015/0005970 | A1 * | 1/2015 | Zweigle | H02J 3/24 700/295 |
| 2015/0069978 | A1 * | 3/2015 | Watanabe | H02J 3/16 323/205 |
| 2015/0085417 | A1 * | 3/2015 | Johnson | H02H 9/041 361/118 |
| 2015/0088326 | A1 * | 3/2015 | Fortmann | F03D 7/043 700/287 |
| 2015/0137520 | A1 * | 5/2015 | Garcia | H02J 3/1885 290/44 |
| 2015/0211492 | A1 * | 7/2015 | Garcia | F03D 7/043 290/44 |
| 2015/0249338 | A1 * | 9/2015 | Nelson | H02J 3/1885 307/84 |

(56) References Cited

U.S. PATENT DOCUMENTS

| | | | | |
|---|---|---|---|---|
| 2015/0300318 A1* | 10/2015 | Mayer | ................... | F03D 7/0272 |
| | | | | 290/44 |
| 2015/0369217 A1* | 12/2015 | Gupta | ....................... | H02J 3/16 |
| | | | | 290/44 |
| 2016/0108890 A1* | 4/2016 | Garcia | ................. | F03D 1/0666 |
| | | | | 700/287 |
| 2016/0126739 A1* | 5/2016 | Shi | ........................... | H02J 3/32 |
| | | | | 307/31 |
| 2016/0134114 A1* | 5/2016 | Gupta | ................. | H02J 3/1842 |
| | | | | 307/82 |
| 2016/0322818 A1* | 11/2016 | Malengret | .............. | G06Q 50/06 |
| 2017/0317498 A1* | 11/2017 | Guo | ........................ | H02J 3/381 |

FOREIGN PATENT DOCUMENTS

| | | | |
|---|---|---|---|
| JP | 2011-205736 A | | 10/2011 |
| JP | 2012-200111 A | | 10/2012 |
| KR | 10-2012-0025121 A | | 3/2012 |
| KR | 10-1127672 B1 | | 3/2012 |

\* cited by examiner

FIG. 9

| Node | Voltage [pu] | | | | %Vdrop [%] | | | |
|---|---|---|---|---|---|---|---|---|
| | Case1: DG Output=0 | Case2: DG p.f.=0.904 | Case 3: DG p.f.=0.948 | Case 4: DG p.f.=0.99 | Case1: DG Output=0 | Case2: DG p.f.=0.904 | Case 3: DG p.f.=0.948 | Case 4: DG p.f.=0.99 |
| node #0 | 1.000 | 1.000 | 1.000 | 1.000 | 0.00% | 0.00% | 0.00% | 0.00% |
| node #1 | 0.996 | 0.996 | 0.997 | 0.998 | 0.40% | 0.39% | 0.34% | 0.24% |
| node #2 | 0.992 | 0.993 | 0.994 | 0.996 | 0.76% | 0.75% | 0.64% | 0.43% |
| node #3 | 0.989 | 0.989 | 0.991 | 0.994 | 1.08% | 1.06% | 0.90% | 0.59% |
| node #4 | 0.986 | 0.987 | 0.989 | 0.993 | 1.36% | 1.34% | 1.12% | 0.71% |
| node #5 | 0.984 | 0.984 | 0.987 | 0.991 | 1.59% | 1.57% | 1.33% | 0.85% |
| node #6 | 0.982 | 0.982 | 0.985 | 0.990 | 1.79% | 1.77% | 1.49% | 0.96% |
| node #7 | 0.981 | 0.981 | 0.984 | 0.990 | 1.95% | 1.93% | 1.62% | 1.02% |
| node #8 | 0.979 | 0.980 | 0.983 | 0.990 | 2.06% | 2.05% | 1.71% | 1.05% |
| node #9 | 0.979 | 0.979 | 0.982 | 0.990 | 2.14% | 2.13% | 1.76% | 1.03% |
| node #10 | 0.978 | 0.978 | 0.982 | 0.990 | 2.18% | 2.17% | 1.77% | 0.98% |

FIG. 11

| Node | Voltage [pu] | | | | %Vdrop [%] | | | |
|---|---|---|---|---|---|---|---|---|
| | Case1: DG Output=0 | Case2: DG p.f.=0.905 | Case 3: DG p.f.=0.949 | Case 4: DG p.f.=0.998 | Case1: DG Output=0 | Case2: DG p.f.=0.905 | Case 3: DG p.f.=0.949 | Case 4: DG p.f.=0.998 |
| node #0 | 1.000 | 1.000 | 1.000 | 1.000 | 0.00% | 0.00% | 0.00% | 0.00% |
| node #1 | 0.999 | 0.999 | 0.999 | 1.000 | 0.11% | 0.11% | 0.06% | -0.04% |
| node #2 | 0.998 | 0.998 | 0.999 | 1.001 | 0.20% | 0.22% | 0.11% | -0.09% |
| node #3 | 0.997 | 0.997 | 0.999 | 1.002 | 0.29% | 0.31% | 0.15% | -0.16% |
| node #4 | 0.996 | 0.996 | 0.998 | 1.002 | 0.36% | 0.39% | 0.18% | -0.23% |
| node #5 | 0.996 | 0.995 | 0.998 | 1.003 | 0.43% | 0.45% | 0.21% | -0.25% |
| node #6 | 0.995 | 0.995 | 0.998 | 1.003 | 0.48% | 0.51% | 0.24% | -0.29% |
| node #7 | 0.995 | 0.994 | 0.997 | 1.003 | 0.52% | 0.56% | 0.25% | -0.34% |
| node #8 | 0.994 | 0.994 | 0.997 | 1.004 | 0.55% | 0.59% | 0.26% | -0.39% |
| node #9 | 0.994 | 0.994 | 0.998 | 1.005 | 0.57% | 0.61% | 0.25% | -0.46% |
| node #10 | 0.994 | 0.994 | 0.998 | 1.005 | 0.58% | 0.62% | 0.23% | -0.54% |

APPARATUS AND METHOD FOR OPERATING DISTRIBUTED GENERATOR IN CONNECTION WITH POWER SYSTEM

RELATED APPLICATIONS

This application is the U.S. National Phase under 35 U.S.C. § 371 of International Patent Application No. PCT/KR2013/008662, filed on Sept. 27, 2013, which in turn claims the benefit of Korean Patent Application No. 10-2013-0075242 filed on Jun. 28, 2013, the disclosures of which Applications are incorporated by reference herein.

TECHNICAL FIELD

The present invention relates to an apparatus and a method for operating a distributed generator in connection with a power system, and more particularly, to an apparatus and a method for operating a distributed generator in connection with a power system in which voltage fluctuations at a point of common coupling with the distributed generator are restrained to prevent a voltage at the point of common coupling with the distributed generator from exceeding an allowable limit when the distributed generator is connected with the power system.

BACKGROUND ART

When a distributed generator is connected with a distribution system, a voltage at a point of common coupling with the distributed generator is increased by active power of the distributed generator injected into the distribution system.

The voltage at the point of common coupling with the distributed generator is increased because an active output is injected into a point of common coupling with the distribution system in such a way that a flow of power from the point of common coupling to a substation, that is, a normal direction flow of power in the distribution system and a reverse direction flow of power occur, thereby increasing the voltage to a degree of the product of a current and a line impedance at that time.

Accordingly, power suppliers restrict a capacity of the distributed generator in connection with a distribution system to prevent a voltage at a point of common coupling with the distributed generator from exceeding a tolerance range due to the distributed generator.

Particularly, it is difficult to additionally connect a distributed generator with a distribution line in connection with existing distributed generators due to a voltage rise at a point of common coupling with the distributed generator. This is because applications for connecting a distributed generator converge on regions having similar location requirements. Also, as a result, even though a capacity of a distributed generator to be newly connected is small, it may be impossible to connect.

To connect a distributed generator not allowed to be connected, it is necessary to detect a new point of common coupling with the distributed generator at another distribution line or to build a new exclusive distribution line from a substation. However, in this case, it is impossible to start business due to excessive costs.

Such technical limitation of conventional technologies socially causes a loss in opportunity cost and becomes an obstacle in a new renewable energy supply policy and an eco-friendly policy for restraining carbon dioxide discharge.

The related art of the present invention is disclosed in Korea Patent Publication No. 10-2012-0025121 (Mar. 15, 2012) under the title of "An optimal voltage control system and method for dispersed generation interconnected primary distribution line."

DISCLOSURE

Technical Problem

An aspect of the present invention is to provide an apparatus and method for operating a distributed generator in connection with a power system, which restrain voltage fluctuations at a point of common coupling with the distributed generator by compensating a voltage rise portion at the point of common coupling with the distributed generator caused by an active output of the distributed generator with a voltage drop portion of a reactive output of the distributed generator.

An aspect of the present invention is to also provide an apparatus and method for operating a distributed generator in connection with a power system, which increase a connection capacity of the distributed generator at the same distribution line.

An aspect of the present invention is to also provide an apparatus and method for operating a distributed generator in connection with a power system, which promote the distributed generator whose generation source is a new renewable energy source by reducing distributed generator connection costs and efficiently operate power facilities by maximizing a utilization rate of a distribution line.

An aspect of the present invention is to also provide an apparatus and method for operating a distributed generator in connection with a power system, which provide an appropriate solution depending on information communication infrastructure conditions of a connected distribution line by providing an operation method in connection with an host operation system with the support of an information communication infrastructure and applying a locally optimized solution performed without the support of the information communication infrastructure.

Technical Solution

One aspect of the present invention provides an apparatus for operating a distributed generator in connection with a power system. The apparatus includes an input unit which receives a parameter calculated using power system information and a voltage and a current at a point of common coupling with the distributed generator, with which the distributed generator is connected, a calculation unit which calculates an operating power factor instruction value and an active output instruction value using the parameter and the voltage and current at the point of common coupling with the distributed generator input to the input unit, and a control communication unit which determines and transmits the operating power factor instruction value and the active output instruction value according to the voltage at the point of common coupling with the distributed generator input to the input unit and an admissible voltage upper limit at the point of common coupling with the distributed generator to the distributed generator.

The control communication unit may determine the active output instruction value as an allowable active power generation amount of the distributed generator when the voltage at the point of common coupling with the distributed generator input to the input unit exceeds the admissible voltage upper limit at the point of common coupling with the distributed generator.

The control communication unit may determine the active output instruction value as a preset first set value when the voltage at the point of common coupling with the distributed generator input to the input unit is the admissible voltage upper limit at the point of common coupling with the distributed generator or less.

The control communication unit may compare a present instantaneous active power output amount of the distributed generator with a regular optimal active power generation amount and may determine the operating power factor instruction value according to a comparison result when the voltage at the point of common coupling with the distributed generator input to the input unit is the admissible voltage upper limit at the point of common coupling with the distributed generator or less.

The control communication unit may determine the operating power factor instruction value as a second set value when the present instantaneous active power output amount is the regular optimal active power generation amount or less.

The control communication unit may calculate the operating power factor instruction value to compensate a voltage rise portion at the point of common coupling with the distributed generator with a voltage drop portion caused by the reactive output when the present instantaneous active power output amount exceeds the regular optimal active power generation amount.

The operating power factor instruction value may be a ratio of the active output to a reactive output of the distributed generator, which divides a line impedance corresponding to a section from the point of common coupling with the distributed generator to the substation into a resistance component and a reactance component and allows a voltage rise portion caused by the active output and the resistance component to be identical to a voltage drop portion caused by the reactive output and the reactance component.

Another aspect of the present invention provides an apparatus for operating a distributed generator in connection with a power system. The apparatus includes a main control device which calculates active power of the distributed generator and a parameter with respect to an interconnection line using power system information, a local controller which calculates an operating power factor instruction value of the distributed generator and an active output instruction value of the distributed generator using the parameter calculated at the main control device and a voltage and a current at a point of common coupling with the distributed generator in which the distributed generator is connected to a distribution system, and the distributed generator which generates the active power and reactive power according to the operating power factor instruction value and the active output instruction value calculated at the local controller.

The parameter may include a voltage upper limit minimum voltage margin at the point of common coupling with the distributed generator, an allowable active power generation amount of the distributed generator, a regular optimal active power generation amount of the distributed generator, and a line impedance of the point of common coupling with the distributed generator.

The local controller may include an input unit which receives and stores the parameter from the main control device and the voltage and current at the point of common coupling, a calculation unit which calculates the operating power factor instruction value and the active output instruction value using the parameter and the voltage and current at the point of common coupling with the distributed generator stored in the input unit, and a control communication unit which determines and transmits the operation power factor instruction value and the active output instruction value calculated by the calculation unit according to the voltage of the input unit and an admissible voltage upper limit at the point of common coupling with the distributed generator to the distributed generator.

The distributed generator may include a distributed generator calculation unit which receives the operating power factor instruction value and the active output instruction value from the local controller and calculates an active power target value and a reactive power target value, an operating unit which adjusts the active power target value and the reactive power target value received from the distributed generator control unit, a generating unit which generates according to the active power target value and the reactive power target value adjusted by the operating unit and outputs the active power and reactive power, and a distributed generator control unit which monitors the active power and the reactive power output from the generating unit and inputs a maximum output operating condition to the distributed generator control unit according to an operating state.

The distributed generator control unit may control to output the active power and the reactive power with an optimal operating condition when the operating power factor instruction value input from the local controller is a second set value and the active output instruction value is a first set value.

When the active output instruction value is set as the first set value and the operating power factor instruction value is not set as the second set value, the distributed generator control unit may limit an operation to the allowable active power generation amount or may operate with the operating power factor instruction value depending on whether the generating unit is operable with the operating power factor instruction value.

When the active output instruction value is not set as the first set value, the distributed generator control unit may operate while limiting an active output according to the allowable active power generation amount.

Still another aspect of the present invention provides a method of operating a distributed generator in connection with a power system. The method includes calculating a line impedance corresponding to a section from a point of common coupling with the distributed generator, at which the distributed generator is connected to the power system, to a substation, calculating a distributed generator operating power factor which restrains voltage fluctuations at the point of common coupling with the distributed generator using the line impedance, an active output of the distributed generator, and a reactive output of the distributed generator, and operating the distributed generator according to the distributed generator operating power factor.

The distributed generator operating power factor may be a ratio of the active output of the distributed generator and the reactive output of the distributed generator, which allows a voltage rise portion caused by the active output of the distributed generator and a resistance component of the line impedance to be identical to a voltage drop portion caused by the reactive output of the distributed generator and a reactance component of the line impedance.

The operating of the distributed generator may include compensating a voltage rise portion at the point of common coupling with the distributed generator with a voltage drop portion at the point of common coupling with the distributed generator.

Advantageous Effects

According to the embodiments of the present invention, voltage fluctuations at a point of common coupling with a distributed generator are restrained by compensating a voltage rise portion at the point of common coupling with the distributed generator caused by an active output of the distributed generator with a voltage drop portion caused by a reactive output of the distributed generator.

According to the embodiments of the present invention, a capacity for connecting distributed generators to the same distribution line is increased.

According to the embodiments of the present invention, the diffusion of a distributed generator with a new renewable energy source as a generating source is promoted and a utilization rate of a distribution line is maximized by reducing distributed generator connection costs, thereby efficiently operating power facilities.

The present invention provides an operation method in connection with an upper operating system capable of supporting information communication infrastructures and allows a locally optimized solution performed without the support of information communication infrastructures to be applied, thereby providing an appropriate solution according to information communication infrastructure conditions of a connected distribution line.

BRIEF DESCRIPTION OF DRAWINGS

FIG. 9 is a view illustrating a result of analyzing a model system simulation under a heavy-load condition (10 MVA and 1.0 pu) according to one embodiment of the present invention;

FIG. 11 is a view illustrating a result of analyzing a model system simulation under a light-load condition (2.5 MVA and 0.25 pu) according to one embodiment of the present invention;

MODE FOR INVENTION

Figure 1:
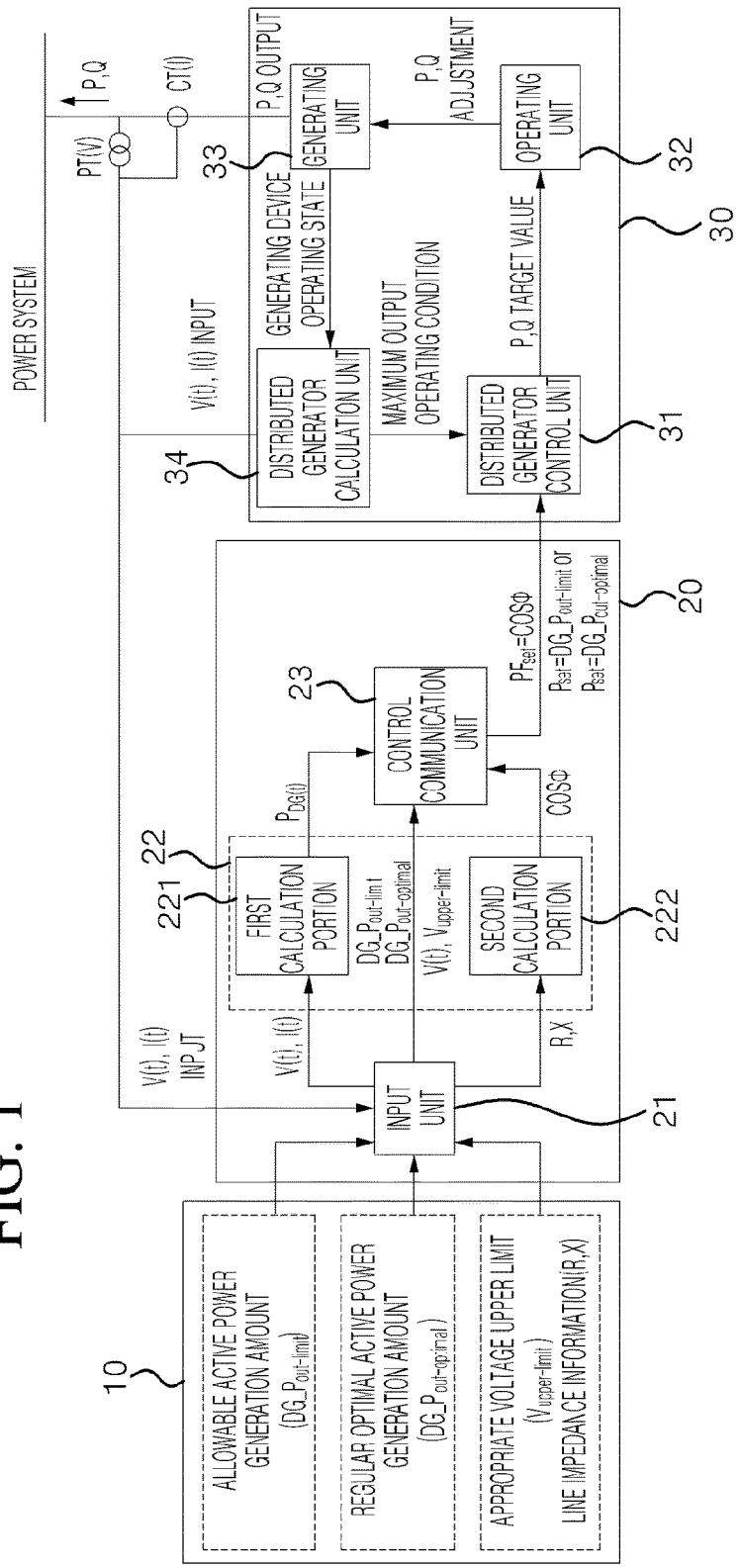
FIG. 1 is a block diagram illustrating a configuration of an apparatus for operating a distributed generator in connection with a power system according to one embodiment of the present invention.

Hereinafter, an apparatus and a method for operating a distributed generator in connection with a power system according to one embodiment of the present invention will be described in detail with reference to the attached drawings. In the drawings, thicknesses of lines or sizes of components may be exaggerated for clarity and convenience of description. Also, terms described below are defined considering functions thereof in the present invention, which may vary with a user, an intention of an operator, or practice. Accordingly, definitions thereof will be given based on the contents throughout the specification.

Figure 2:
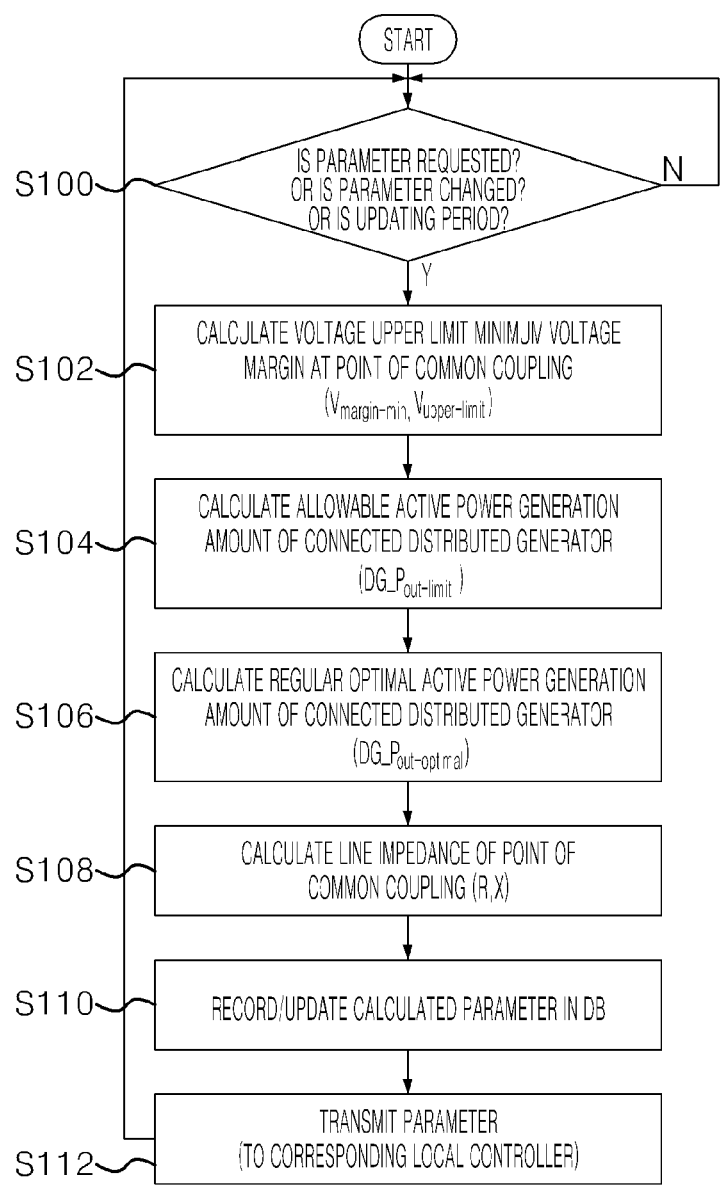
FIG. 2 is a flowchart illustrating an operation process of a main control device of FIG. 1.
Figure 3:
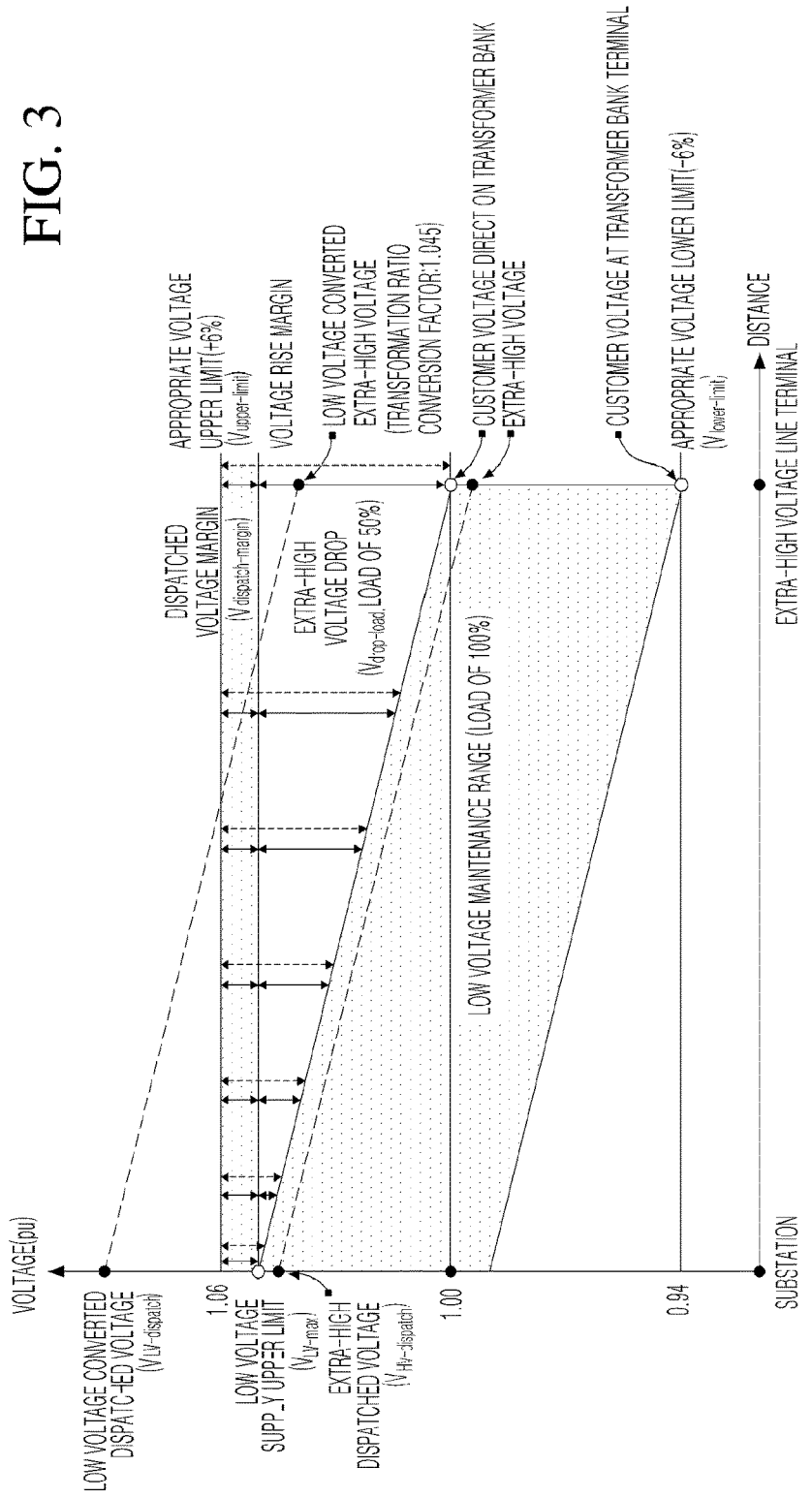
FIG. 3 is a view of a voltage management system for a distribution line under a maximum load condition.
Figure 4:
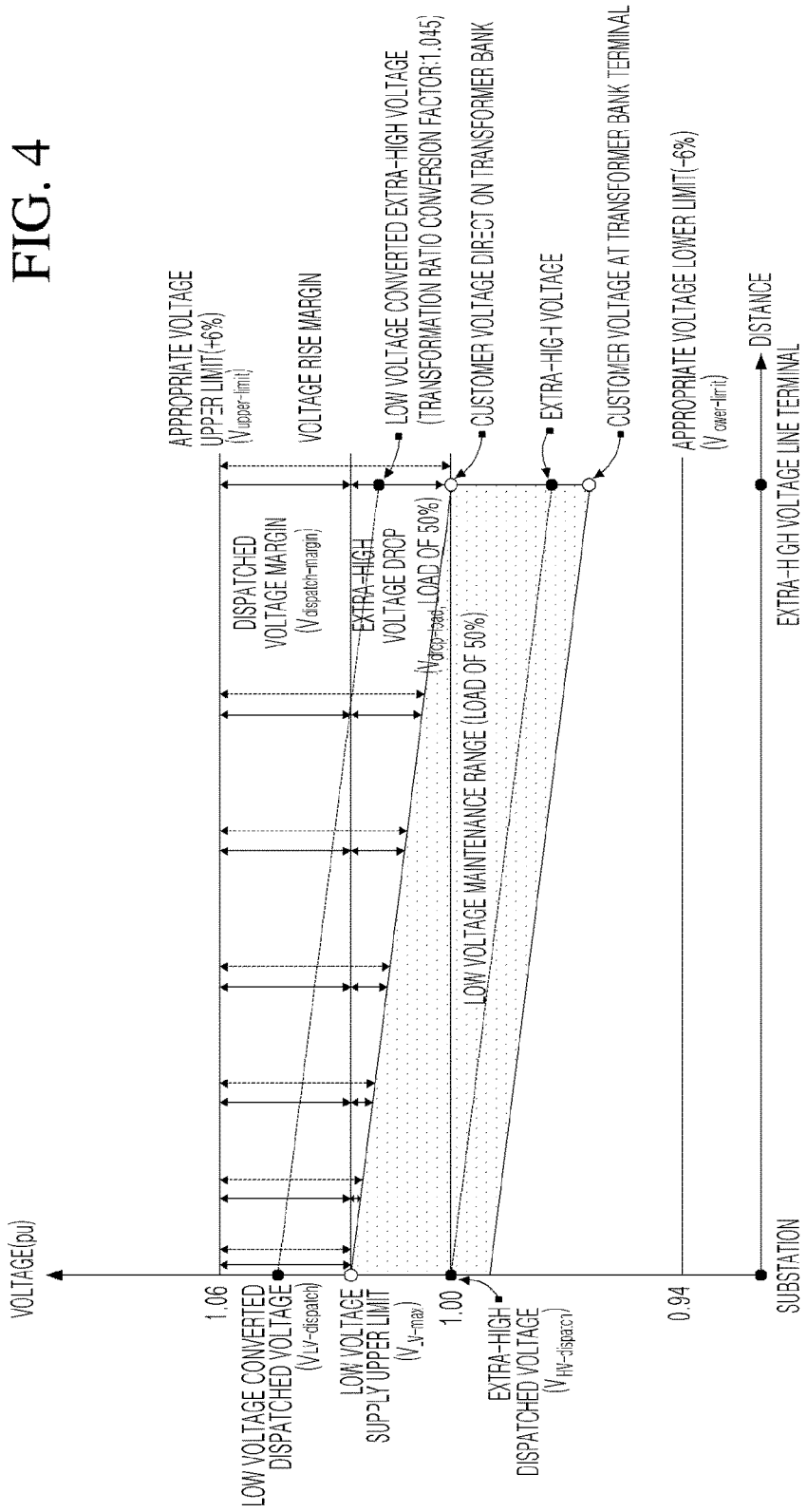
FIG. 4 is a view of the voltage management system for a distribution line under a regular load condition.
Figure 5:
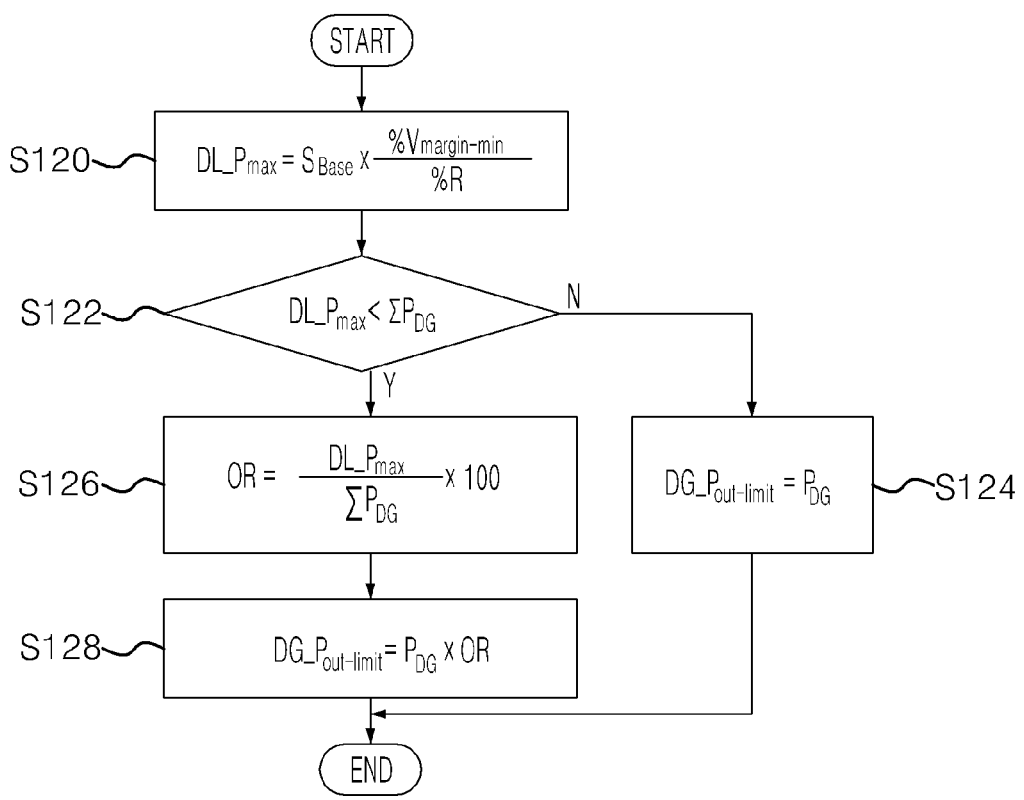
FIG. 5 is a flowchart illustrating a process of calculating an allowable active power generation amount of a connected distributed generator of the main control device of FIG. 1.
Figure 6:
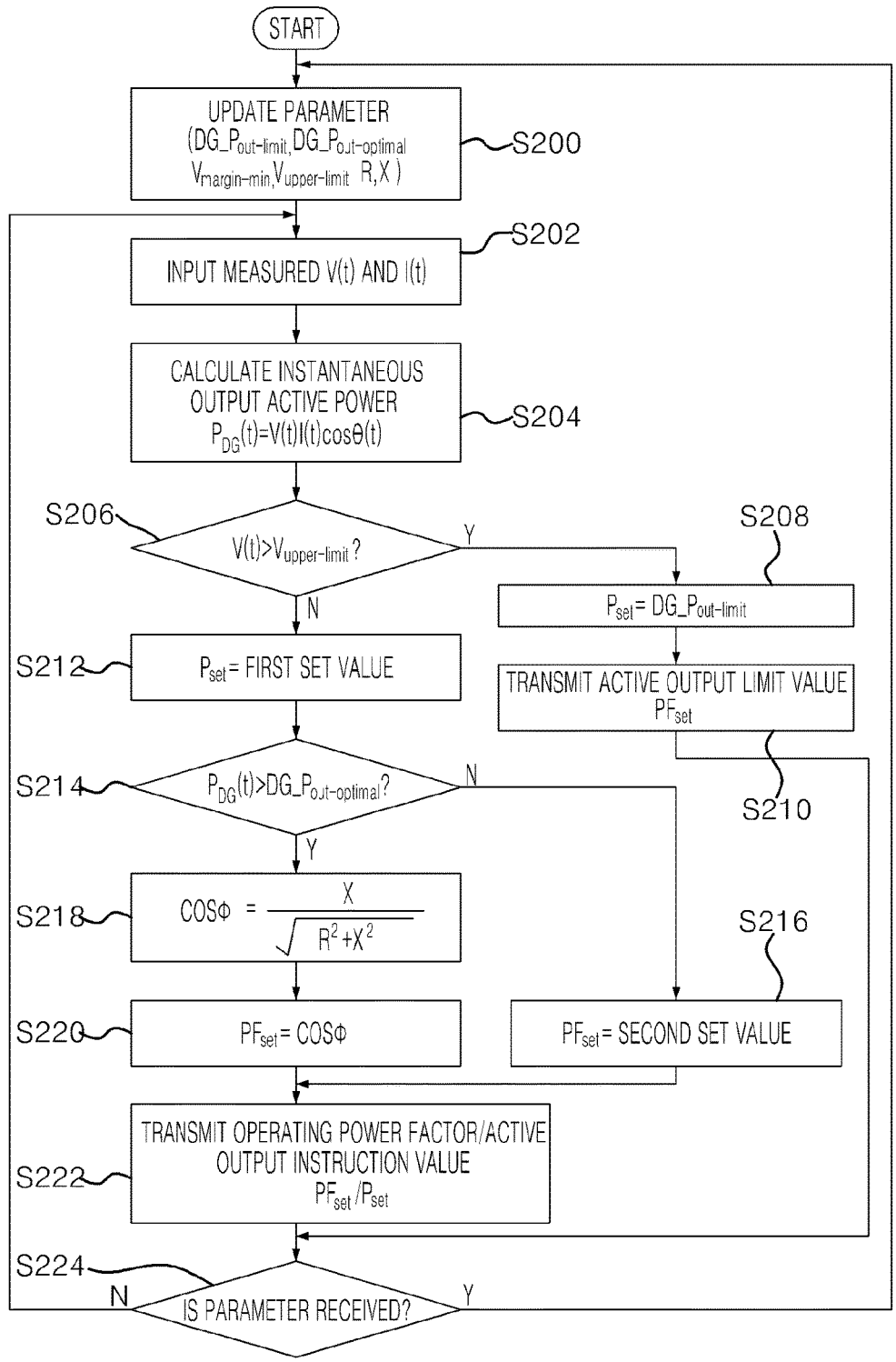
FIG. 6 is a flowchart illustrating an operation process of a local controller of FIG. 1.
Figure 7:
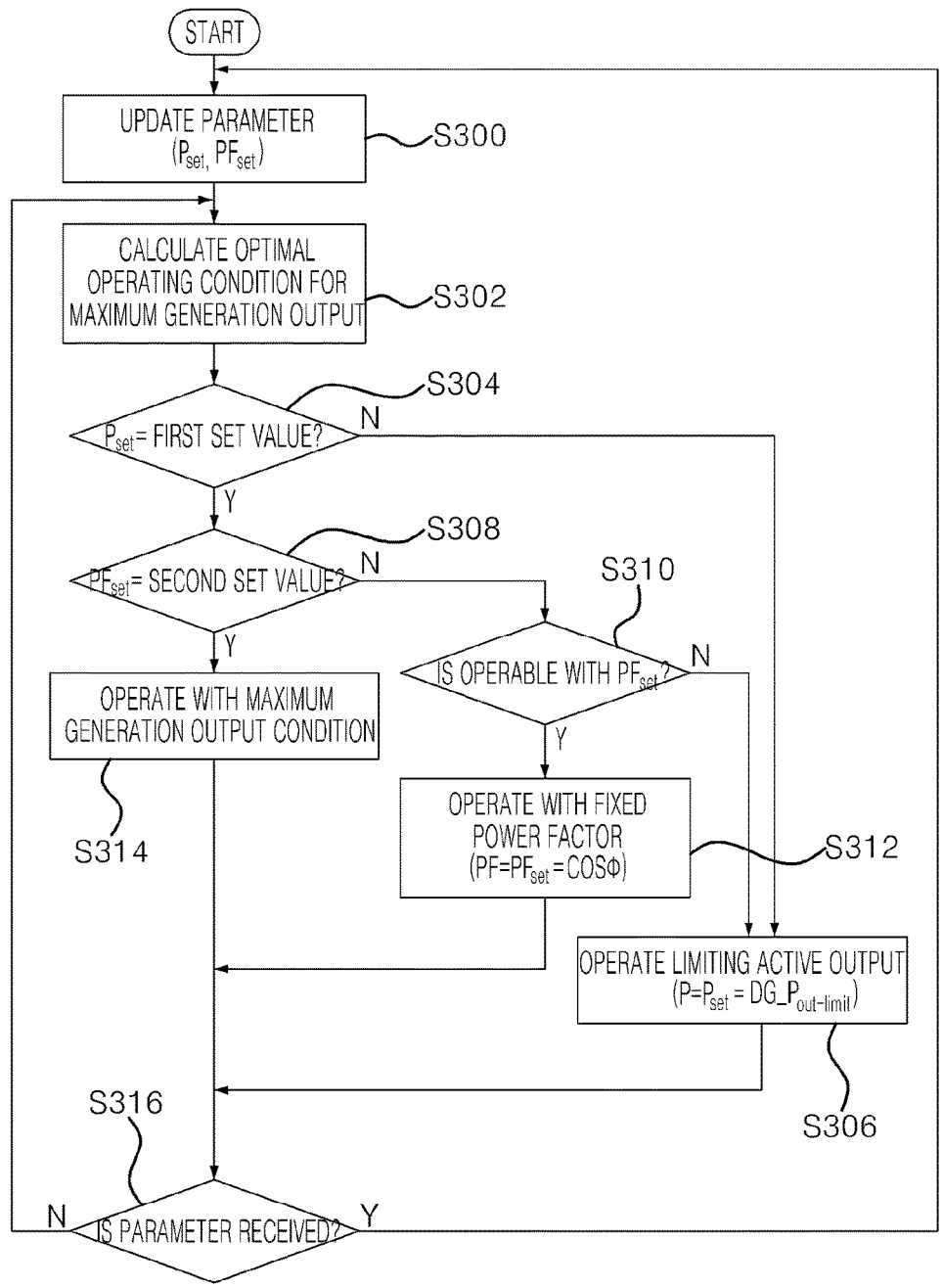
FIG. 7 is a flowchart illustrating an operation process of a distributed generator controller of FIG. 1.

FIG. 1 is a block diagram illustrating a configuration of an apparatus for operating a distributed generator in connection with a power system according to one embodiment of the present invention. FIG. 2 is a flowchart illustrating an operation process of a main control device of FIG. 1. FIG. 3 is a view of a voltage management system for a distribution line under a maximum load condition. FIG. 4 is a view of a voltage management system for a distribution line under a regular load condition. FIG. 5 is a flowchart illustrating a process of calculating an allowable active power generation amount of the distributed generator in association with the main control device of FIG. 1. FIG. 6 is a flowchart illustrating an operation process of a local controller of FIG. 1. FIG. 7 is a flowchart illustrating an operation process of a distributed generator controller of FIG. 1.

Referring to FIG. 1, an apparatus for operating a distributed generator in connection with a power system according to one embodiment of the present invention includes a main control device 10, a local controller 20, and a distributed generator 30.

The main control device 10 calculates and transmits an allowable active power generation amount $DG\_P_{out\text{-}limit}$ of the distributed generator 30, a regular optimal active power generation amount $DG\_P_{out\text{-}optimal}$ of the distributed generator 30, an admissible voltage upper limit $V_{upper\text{-}limit}$ of an interconnection line, and impedance information R and X of a connected distribution line to the local controller 20 of the corresponding distributed generator 30.

The main control device 10 described above stores power system information such as voltage distribution and a load factor of the power system, a bus voltage of a substation, and an operation state of the distributed generator 30 and figures out the overall operation state of the power system.

Through this, the main control device 10 calculates the allowable active power generation amount $DG\_P_{out\text{-}limit}$, calculates a voltage drop considering the load factor of the corresponding distribution line, and calculates the regular optimal active power generation amount DG_P$_{out\text{-}optimal}$ of the connected distributed generator 30. Particularly, since the regular optimal active power generation amount DG_P$_{out\text{-}optimal}$ varies together with a change of the load factor, the main control device 10 periodically calculates the regular optimal active power generation amount DG_P$_{out\text{-}optimal}$. Since the regular optimal active power generation amount DG_P$_{out\text{-}optimal}$ is greater than the allowable active power generation amount DG_P$_{out\text{-}limit}$, a limitation on a generation amount of a power generation provider may be minimized.

The main control device 10 has to comprehensively determine such a regular optimal active power generation amount DG_P$_{out\text{-}optimal}$ considering information such as the load factor of the line, voltage drop distribution according thereto, and a bus-dispatched voltage of the substation.

The operation process of the main control device 10 will be described with reference to FIG. 2.

Referring to FIG. 2, when a parameter request is made by the local controller 20, a parameter is changed due to a system change, or a updating period for updating the parameter comes (S100), the main control device 10 calculates an voltage upper limit minimum voltage margin V$_{margin\text{-}min}$ of a point of common coupling with the distributed generator, the allowable active power generation amount DG_P$_{out\text{-}limit}$ and the regular optimal active power generation amount DG_P$_{out\text{-}optimal}$ of the corresponding distributed generator 30, the admissible voltage upper limit V$_{upper\text{-}limit}$ of the corresponding line, and the impedance information R and X of the corresponding line (S102 to S108), records and updates these parameters (S110), and transmits the parameters to the local controller 20 of the corresponding distributed generator 30 (S112).

Here, a method of calculating the allowable active power generation amount DG_P$_{out\text{-}limit}$ and the regular optimal active power generation amount DG_P$_{out\text{-}optimal}$ of the corresponding distributed generator 30, the admissible voltage upper limit V$_{upper\text{-}limit}$ of the corresponding line, and the impedance information R and X of the corresponding line will be described below.

In addition, the main control device 10 calculates a connectable active power maximum amount DL_P$_{max}$ which does not exceed an admissible voltage range although being connected to any point of each distribution line for each distribution line and adds a gross capacity $\Sigma$P$_{DG}$ of the distributed generator 30 connected to each distribution line. When the gross capacity $\Sigma$P$_{DG}$ exceeds the connectable active power maximum amount DL_P$_{max}$, the allowable active power generation amount DG_P$_{out\text{-}limit}$ of the individual distributed generator 30 is calculated and distributed to each distributed generator 30.

Through this, when a late provider applies for additional connection of the distributed generator 30, an host operation system allows the late provider to receive an active power generation rate identical to those of existing providers. Through this, it is possible to maintain equity among providers and to maximize a utilization rate of distributing facilities.

The method of calculating the allowable active power generation amount DG_P$_{out\text{-}limit}$ and the regular optimal active power generation amount DG_P$_{out\text{-}optimal}$ of the distributed generator 30, the admissible voltage upper limit V$_{upper\text{-}limit}$ of the corresponding line, and the impedance information R and X of the corresponding line will be described.

The voltage upper limit minimum voltage margin V$_{margin\text{-}min}$ at the point of common coupling with the distributed generator is calculated from a dispatched voltage margin V$_{dispatch\text{-}margin}$ shown in FIG. 3.

A voltage rise margin is calculated by adding the dispatched voltage margin to an extra-high voltage drop portion.

Since the extra-high voltage drop portion varies according to a length of the line and an extra-high voltage load factor, the minimum voltage margin available regardless of a connection position becomes the dispatched voltage margin.

The dispatched voltage margin is calculated by subtracting a low voltage supply upper limit from the admissible voltage upper limit shown in FIG. 3 as shown in following Equation 1. The admissible voltage upper limit is a value to be obligatorily complied with according to a voltage management system by a power provider according to laws and rules. Domestically, 233 V (1.06 pu) is an example thereof.

$$V_{margin\text{-}min} = V_{dispatch\text{-}margin} = V_{upper\text{-}lim} - V_{LV\text{-}max} \qquad \text{Equation 1}$$

Here, V$_{margin\text{-}min}$ indicates a voltage upper limit minimum voltage margin, V$_{dispatch\text{-}margin}$ indicates a dispatched voltage margin, V$_{upper\text{-}limit}$ indicates an admissible voltage upper limit, and V$_{LV\text{-}max}$ indicates a low voltage supply upper limit.

The low voltage supply upper limit V$_{margin\text{-}min}$, as shown in following Equation 2, is calculated by subtracting a voltage drop portion caused by a transformer and a lead-in wire from a value obtained by converting an extra-high dispatched voltage into a low voltage.

The low voltage is converted by multiplying an extra-high voltage by a transformation ratio. For example, to convert an extra-high regular voltage of 13200 V into a low regular voltage of 220V, a transformation ratio of 13200/230 is used. In this case, when an extra-high voltage is 13200 V (1.0 pu), a low voltage becomes 230 V (about 1.045 pu) higher than 220 V (1.0 pu) by 10 V. Accordingly, when an extra-high voltage is converted into a low voltage, it is necessary to multiply a transformation ratio conversion factor of 1.045.

$$\begin{aligned} V_{LV\text{-}max} &= V_{LV\text{-}dispatch} - (V_{drop\text{-}tr} + V_{drop\text{-}service}) \\ V_{LV\text{-}dispatch} &= V_{HV\text{-}dispatch} \times C_{tr} \end{aligned} \qquad \text{Equation 2}$$

Here, V$_{LV\text{-}dispatch}$ indicates a dispatched voltage obtained by converting into a low voltage, V$_{HV\text{-}dispatch}$ indicates an extra-high substation-dispatched voltage (an extra-high voltage of a secondary bus of the substation), C$_{tr}$ indicates a transformation ratio conversion factor which transforms an extra-high voltage into a low voltage, V$_{drop\text{-}tr}$ indicates a voltage drop at a transformer, and V$_{drop\text{-}service}$ indicates a voltage drop at a lead-in wire.

As shown in Equations 1 and 2 and FIGS. 3 and 4, the voltage upper limit minimum voltage margin V$_{margin\text{-}min}$ at the point of common coupling with the distributed generator is determined by the extra-high dispatched voltage determined by a tap position of a main transformer of the substation and a load factor of a corresponding distribution line. Since such values vary with time, the voltage upper limit minimum voltage margin V$_{margin\text{-}min}$ at the point of common coupling with the distributed generator is periodically calculated and determined.

The allowable active power generation amount DG-P$_{out\text{-}limit}$ of the connected distributed generator 30 is calculated as follows. First, a tap change point of a distributing transformer to compensate a voltage drop at a terminal of an interconnection line or an extra-high voltage line may be determined to be a connection check point. A maximum connectable active power aggregate amount DL_P$_{max}$ of the distribution line which is within an admissible voltage range at the connection check point is calculated. Regardless of a location of the interconnection line, the maximum connectable active power aggregate amount DL_$P_{max}$ should not generate a voltage rise at a corresponding distribution line. Accordingly, as a voltage rise margin, a dispatched voltage margin of FIG. 4 provided as the same value regardless of location is used. A voltage change which occurs when the distributed generator 30 generates power at a random common coupling point is calculated through following Equation 3.

$$\% V_{pcc} = (\% R \cdot \cos\phi \pm \% X \cdot \sin\phi) \times \frac{S_{DG}}{S_{Base}} \quad \text{Equation 3}$$

Here, % $V_{pcc}$ indicates a regular voltage variation [%] at the point of common coupling with the distributed generator, $S_{Base}$ indicates a reference capacity, $S_{DG}$ indicates an installed capacity of the distributed generator 30 and is $P_{DG}$·cos φ, % R indicates a resistance component of a % line impedance calculated as the reference capacity from the substation to the point of common coupling with the distributed generator, and % X indicates a reactance component of the % line impedance calculated as the reference capacity from the substation to the point of common coupling with the distributed generator.

In Equation 3, a condition in which a voltage rise becomes maximum is when the distributed generator 30 is connected to a point where a line impedance is greatest while operating at a power factor of 1. Accordingly, when the distributed generator 30 is connected to the terminal of the line or the tap change point and operates at the power factor of 1, that is, when the voltage change % $V_{pcc}$ calculated using Equation 3 does not exceed the minimum voltage margin that is the dispatched voltage margin (% $V_{dispatch-margin}$=% $V_{margin-min}$) and operates an operating condition of the power factor of 1, the installed capacity $S_{DG}$ of the distributed generator may be calculated as the maximum connectable active power aggregate amount DL_$P_{max}$ of the corresponding distribution line. A method of calculating the maximum connectable active power aggregate amount DL_$P_{max}$ is same as following Equation 4. When the power factor is 1, Equation 3 may be shown as following Equation 4 (cos φ=1).

$$\% V_{pcc} = \% R \times \frac{P_{DG}}{S_{Base}} \quad \text{Equation 4}$$

$$P_{DG} = S_{Base} \times \frac{\% V_{pcc}}{\% R}$$

In Equation 4, when % $V_{pcc}$=% $V_{margin-min}$, $P_{DG}$=DL_$P_{max}$. Accordingly, the maximum connectable active power aggregate amount DL_$P_{max}$ at the interconnection line may be calculated as following Equation 5 (S120). Here, % R indicates a resistance component of a % impedance calculated using a reference capacity from a substation to a terminal at an interconnection line or from the substation to a tap change point.

$$DL\_P_{max} = S_{Base} \times \frac{\% V_{margin-min}}{\% R} \quad \text{Equation 5}$$

Since a terminal of an interconnection line and a distributing transformer tap change point are points with a highest voltage rise among points of common coupling with the distributed generator, the maximum connectable active power aggregate amount DL_$P_{max}$ calculated at this voltage rise occurrence point does not cause an overvoltage even though being connected to any point of common coupling with the distributed generator at the interconnection line. That is, when an aggregate capacity of all individual distributed generators 30 does not exceed a connectable aggregate amount, an overvoltage does not occur. Accordingly, an allowable active power generation amount DG_$P_{out-limit}$ of the individual distributed generator 30, as shown in FIG. 5, becomes a regular output capacity $P_{DG}$ of the distributed generator 30 (S122 and S124). That is, even when electric power is generated with 100% of a regular output, an overvoltage does not occur.

On the contrary, when an aggregate capacity Σ$P_{DG}$ of all individual distributed generators 30 exceeds the maximum connectable active power aggregate amount DL_$P_{max}$, the allowable active power generation amount DG_$P_{out-limit}$ of the individual distributed generator 30, as shown in FIG. 5, is distributed at an installed capacity ratio as shown in following Equation 6 (S126 and S128).

$$DG\_P_{out-limit} = P_{DG} \times OR \quad \text{Equation 6}$$

$$OR = \frac{DL\_P_{max}}{\Sigma P_{DG}} \times 100$$

Here, $P_{DG}$ indicates a maximum active output amount of the distributed generator 30 and is an installed capacity (=$S_{DG}$/cos Φ) of the distributed generator 30 when the power factor is 1, Σ$P_{DG}$ indicates an installed capacity aggregate of the all distributed generators 30 of the connected distribution line (when the power factor is 1), and OR indicates an allowable active output operating ratio of the corresponding interconnection line.

The regular optimal active power generation amount DG-$P_{out-optimal}$ of the connected distributed generator 30 is calculated as follows.

The regular optimal active power generation amount DG_$P_{out-optimal}$ is calculated by applying Equation 5, in which a minimum voltage margin is not used as a numerator term but a voltage rise margin shown in FIG. 4 which includes an extra-high voltage drop caused by a load is used.

The regular optimal active power generation amount DG_$P_{out-optimal}$ has a voltage rise margin which differs according to a point of common coupling with the distributed generator, to which the individual distributed generator 30 is connected. This is because a load state and an extra-high voltage drop according thereto differ. The regular optimal active power generation amount DG_$P_{out-optimal}$ is calculated through following Equation 7 formed by modifying Equation 5 described above.

$$DG\_P_{out-optimal} = S_{Base} \times \frac{\% V_{dispatch-margin} + \% V_{drop-load}}{\% R} \quad \text{Equation 7}$$

Here, a value of % R indicates a resistance component of a % line impedance from the substation to the individual distributed generator 30.

Line impedances R and X at the point of common coupling is calculated by adding line impedance data for respective sections from the point of common coupling with the distributed generator to a bus of the substation.

The line impedance data for the respective sections are recorded and managed in a database (not shown) of a power system operating system, in which both a calculated value and an actual measurement value are used, thereby recording and managing data having high accuracy in the database.

The calculated value is generally used for a present distribution line, and the actual measurement value is generally used for a transmission line. A method of calculating the line impedance to the point of common coupling with the distributed generator is as follows.

First, when the point of common coupling with the distributed generator is determined, line impedances for the respective sections are obtained by multiplying % impedance data per km according to line types of the respective sections by section lengths, the line impedances for the respective sections from the substation to the point of common coupling with the distributed generator are added, and the aggregated line impedances are divided into resistance components and reactance components, thereby calculating the line impedances to the point of common coupling with the distributed generator.

The main control device 10 records all the parameters calculated described above in the database and transmit the parameters to the local controller 20.

The local controller 20 calculates an operating power factor instruction value $PF_{set}$ and an active output instruction value $P_{set}$ using the parameters transmitted from the main control device 10 and a voltage V(t) and a current I(t) presently measured at the point of common coupling with the distributed generator and selectively determines and transmits the operating power factor instruction value $PF_{set}$ and the active output instruction value $P_{set}$ to the distributed generator 30.

As shown in FIG. 1, the local controller 20 includes an input unit 21 which receives and stores the parameters transmitted from the main control device 10 of the power system operating system and the voltage and current measured at the point of common coupling with the distributed generator, a calculation unit 22 which calculates new parameters from the parameters transmitted form the main control device 10 and the voltage and current measured at the point of common coupling with the distributed generator, and a control communication unit 23 which finally selects and transmits an appropriate parameter considering data which reflects a power system operating state.

Hereinafter, an operation process of the local controller 20 will be described with reference to FIG. 6.

Referring to FIG. 6, first, the input unit 21 stores and updates the parameters transmitted from the main control device 10 (S200) and receives the voltage and current at the point of common coupling with the distributed generator (S202).

After that, a first calculation portion 221 calculates instantaneous output active power using following Equation 8 (S204).

$$P_{DG}(t)=V(t)I(t)\cos \theta(t) \qquad \text{Equation 8}$$

After that, the control communication unit 23 compares and determines whether the presently measured voltage V(t) exceeds an admissible voltage upper limit $V_{upper\text{-}limit}$ transmitted from the main control device 10 (S206).

Here, when the measured voltage value exceeds the admissible voltage upper limit, the distributed generator 30 reduces an active output to restrain a voltage rise. Accordingly, the control communication unit 23 sets the active output limit value of the distributed generator 30 as an allowable active power generation amount $DG\_P_{out\text{-}limit}$ of the connected distributed generator 30 calculated at the main control device 10 (S208) and transmits the active output limit value $P_{set}$ to the distributed generator 30 (S210). Since the active output limit value $P_{set}$ is a generation amount which does not cause an overvoltage even though being connected to any point of a corresponding distribution line, the distributed generator 30 with a voltage at the point of common coupling with the distributed generator, which exceeds the admissible voltage upper limit, is all set as the active power limit value by the local controller 20.

When transmission of the active power limit value $P_{set}$ is completed, the control communication unit 23 checks whether the parameters are received (S224), and depending on a result thereof, returns to the operation S200 to update the parameters or measures and inputs the voltage and current.

Meanwhile, as a result of the operation 206 in which whether the measured voltage V(t) exceeds the admissible voltage upper limit $V_{upper\text{-}limit}$ transmitted from the main control device 10, when the presently measured voltage is the allowable admissible voltage upper limit $V_{upper\text{-}limit}$ or less, the active output limit value $P_{set}$ of the distributed generator 30 is set as a preset first set value (default) (S212) and it is determined whether a present instantaneous active power output amount $P_{DG}(t)$ exceeds the regular optimal active power generation amount $DG\text{-}P_{out\text{-}optimal}$ of the distributed generator 30 (S214) to determine the operating power factor instruction value $PF_{set}$.

That is, when the instantaneous active power output amount is the regular optimal active power generation amount of the connected distributed generator 30 or less, the control communication unit 23 determines the operating power factor instruction value $PF_{set}$ to be a second set value (default) (S216).

However, when the instantaneous active power output amount is more than the regular optimal active power output amount, an overvoltage may occur at the point of common coupling with the distributed generator. Accordingly, the control communication unit 23 calculates and determines the operating power factor instruction value to prevent voltage fluctuations from occurring at the point of common coupling with the distributed generator through a second calculation portion 222 (S218 and S220).

Here, a process in which the second calculation portion 222 calculates the operating power factor instruction value of the distributed generator 30 is as follows.

First, a regular voltage fluctuation rate at the point of common coupling with the distributed generator is calculated. When the distributed generator 30 is connected to a distribution system and operates at a leading phase power factor (a lagging phase power factor based on power system), the regular voltage fluctuation rate at the point of common coupling with the distributed generator is calculated through following Equation 9.

$$\Delta V_{pcc} = \frac{S_{DG}(R \cdot \cos|\phi| - X \cdot \sin|\phi|)}{V_L^2} \qquad \text{Equation 9}$$

Here, $\Delta V_{pcc}$ indicates a voltage fluctuation rate at the point of common coupling with the distributed generator, $S_{DG}$ indicates a capacity MVA of the distributed generator 30, R indicates a normal resistance component of a distribution line, X indicates a normal reactance component of the distribution line, Φ indicates a power factor angle of the distributed generator 30, $\cos|\phi|$ indicates an operating power factor of the distributed generator 30, and $V_L$ indicates a nominal voltage of the distribution line.

As shown in Equation 9 described above, to minimize the voltage fluctuation rate $\Delta V_{pcc}$ at the point of common coupling with the distributed generator, a numerator in Equation 9 has to be '0'.

Also, since relationships among apparent power $S_{DG}$, active power $P_{DG}$, and reactive power $Q_{DG}$ of the distributed generator 30 are $P_{DG}=S_{DG}\cos|\phi|$ and $Q_{DG}=S_{DG}\sin|\phi|$, Equation 9 may be developed as following Equation 10.

$$S_{DG}(R\cdot\cos|\phi|-X\cdot\sin|\phi|)=0$$

$$S_{DG}\cos|\phi|\cdot R-S_{DG}\sin|\phi|\cdot X=0$$

$$P_{DG}\cdot R=Q_{DG}\cdot X \qquad \text{Equation 10}$$

Here, Equation 10 indicates that there is no voltage fluctuation at the point of common coupling with the distributed generator when a voltage rise portion obtained by multiplying an active output of the distributed generator 30 by a resistance component of the line and a voltage drop portion obtained by multiplying a reactive output of the distributed generator 30 by a reactance component of the line are identical to and compensated with each other.

Equation 10 described above is arranged as following Equation 11.

$$\tan|\phi|=\frac{P_{DG}}{Q_{DG}}=\frac{R}{X} \qquad \text{Equation 11}$$

$$\cos|\phi|=\frac{P_{DG}}{\sqrt{P_{DG}^2+Q_{DG}^2}}=\frac{X}{\sqrt{R^2+X^2}}$$

Here, referring to Equation 11, it may be known that a voltage fluctuation rate becomes 0% when a distributed generator operating power factor is identical to an interaction formula $$\frac{X}{\sqrt{R^2+X^2}}$$

between a normal resistance component and a normal reactance component of the distribution line.

That is, an operating power factor connection condition of the distributed generator 30 with the voltage fluctuation rate of 0% at the point of common coupling with the distributed generator regardless of a capacity for connecting of the distributed generator 30 is determined by an impedance ratio of the distribution line. Actually, since several wires are used for the distribution line in combination, it is necessary to apply combined impedances from a point of common coupling with the distributed generator to a substation for each wire.

Following Table 1 shows wire types of aerial distribution line, corresponding impedance information thereof, and operating power factor calculation values of the distributed generator 30 theoretically calculated to minimize a voltage fluctuation rate using Equation 11.

TABLE 1

Wire Types of Aerial Distribution Line and Corresponding Impedance Information

| Wire type of Distribution line | R(%/km) | X(%/km) | Operating power factor (calculated value) for minimizing voltage fluctuation rate |
|---|---|---|---|
| ACSR 58 (mm$^2$) | 9.48 | 8.3686 | 0.651 |
| ACSR 95 (mm$^2$) | 5.9739 | 8.0851 | 0.804 |
| ACSR 160 (mm$^2$) | 3.4999 | 7.7498 | 0.911 |
| ACSR 240 (mm$^2$) | 2.3604 | 7.4538 | 0.953 |

Meanwhile, when an active output limit value $P_{set}$ and an operating power factor instruction value $PF_{set}$ set as described above are determined, the control communication unit 23 transmits the active output limit value $P_{set}$ and the operating power factor instruction value $PF_{set}$ to the distributed generator 30 (S222).

After that, when transmission of parameters to the distributed generator 30 is completed, the control communication unit 23 determines whether the main control device 10 receives a new parameter (S224) and returns to the operation S200 to update the parameter or returns to the operation S202 to receive a voltage and current depending on a result of the determination.

At last, when there is no input from the local controller 20, the distributed generator 30 autonomously calculates a maximum output operating condition and determines an active power target value and a reactive power target value to operate.

When an input of new parameters, that is, an operating power factor instruction value $PF_{set}$ and an active output instruction value $P_{set}$ are input, the distributed generator 30 determines generation output target values P and Q of active power and reactive power according to a predetermined operating mode using the received operation power factor instruction value $PF_{set}$ and the active output instruction value $P_{set}$.

The distributed generator 30 described above, as shown in FIG. 1, includes a distributed generator control unit 31, an operating unit 32, a generating unit 33, and a distributed generator calculation unit 34.

The distributed generator control unit 31 controls overall the distributed generator 30. When parameters, for example, an operating power factor instruction value $PF_{set}$ and an active output instruction value $P_{set}$ are received from the local controller 20, the distributed generator control unit 31 updates the parameters and calculates optimal operating conditions for a maximum generation output of the distributed generator 30, that is, an active power target value P and a reactive power target value Q to operate.

The operating unit 32 adjusts the active power target value P and the reactive power target value Q received from the distributed generator control unit 31 and inputs the adjusted active power target value P and reactive power target value Q to the generating unit 33.

Accordingly, the generating unit 33 generates according to the active power target value P and the reactive power target value Q adjusted by the operating unit 32 and outputs active power P and reactive power Q.

The distributed generator calculation unit 34 monitors the active power P and the reactive power Q of the generating unit 33 and inputs maximum output operating conditions according to an operating state to the distributed generator control unit 31.

The operation process of the distributed generator 30 will be described in detail with reference to FIG. 7.

Referring to FIG. 7, the distributed generator control unit 31 updates parameters transmitted from the local controller 20 (S300).

The distributed generator control unit 31 updates the parameters transmitted from the local controller 20 in an internal memory (not shown) and calculates optimal operating conditions for a maximum generation output to operate (S302). This is performed according to a basic function of the distributed generator 30.

After that, the distributed generator control unit 31 determines whether the parameters input from the local controller 20, that is, an active output instruction value $P_{set}$ and an operating power factor instruction value $PF_{set}$ are a first set value and a second set value, respectively, (S304 and S308). When the active output instruction value $P_{set}$ and the operating power factor instruction value $PF_{set}$ are the first set value and the second set value, respectively, the distributed generator control unit 31 operates the distributed generator 30 with the optimal operating condition calculated in the operation S302 (S314).

Meanwhile, as a result of the determination in the operation S304, when the active output instruction value $P_{set}$ is not set as the first set value but set as an allowable active power generation amount $DG\_P_{out\text{-}limit}$ of the individual distributed generator 30, the distributed generator control unit 31 operates while limiting an active output to the allowable active power generation amount $DG\_P_{out\text{-}limit}$ (S306).

Here, when the active output instruction value $P_{set}$ is not set as the first set value but set as the allowable active power generation amount $DG\_P_{out\text{-}limit}$ of the individual distributed generator 30, an overvoltage may occur when the distributed generator 30 is continuously operating with a present instantaneous output.

On the other hand, in a state in which the active output instruction value $P_{set}$ is set as the first set value, when the operating power factor instruction value $PF_{set}$ is not set as the second set value but set as an operating power factor instruction value $PF_{set}$ calculated at the second calculation portion 222 as a result of the determination in the operation S308, the distributed generator control unit 31 determines whether the generating unit 33 of the distributed generator 30 is able to operate with the operating power factor instruction value $PF_{set}$ calculated at the second calculation portion 222 considering operating environments such as present active output intensity and an autonomous reactive power generation ability of the distributed generator 30 (S310).

As a result of the operation S310, when it is impossible to operate with the operating power factor instruction value $PF_{set}$, the distributed generator control unit 31 abandons a fixed power factor operating mode, converts into an active output limit mode, and operates not to exceed the allowable active power generation amount $DG\_P_{out\text{-}limit}$ of the individual distributed generator 30 (S306).

However, as the result of the determination in the operation S310, when it is possible to operate with the set operating power factor instruction value $PF_{set}$, the distributed generator control unit 31 converts into the fixed power factor operating mode and operates with a set operating power factor (S312). Since an overvoltage does not occur at the point of common coupling with the distributed generator in all cases, while operating, the distributed generator control unit 31 determines whether parameters are received from the local controller 20 (S316), and depending on a result of the determination thereof, updates new parameters (S300) or returns to the operation S302.

Through this, while respective providers minimize losses of generation amounts, a large number of providers may generate power sharing a distribution line and a utilization rate of facilities of the distribution line may be maximized.

Hereinafter, a result of simulating the apparatus for operating the distributed generator in connection with the power system according to one embodiment of the present invention using a distribution line model of FIG. 8 will be described.

Figure 8:
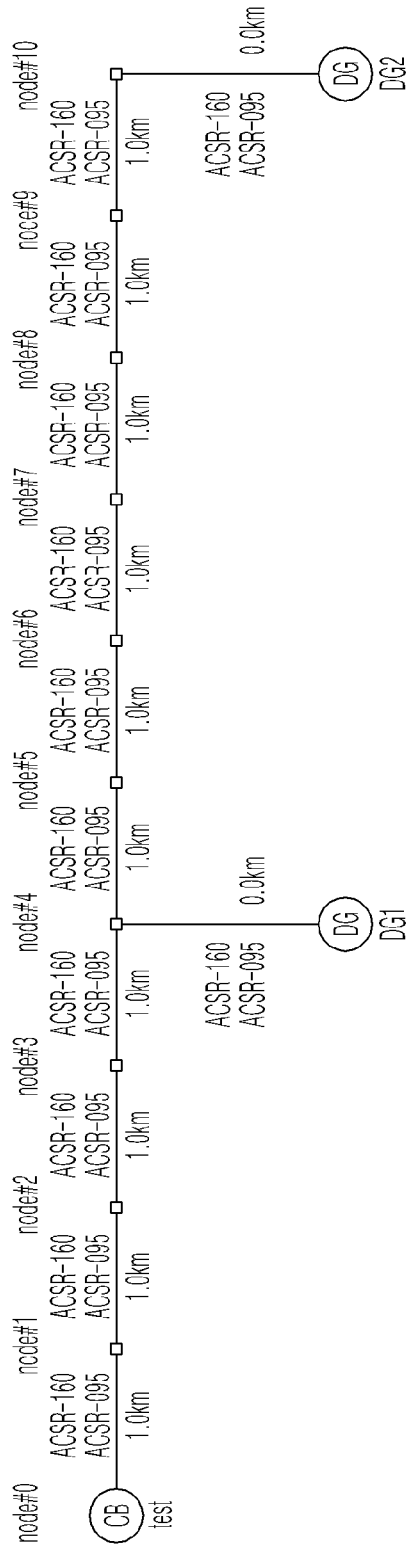
FIG. 8 is a view illustrating an example of a model power distribution system according to one embodiment of the present invention.
Figure 10:
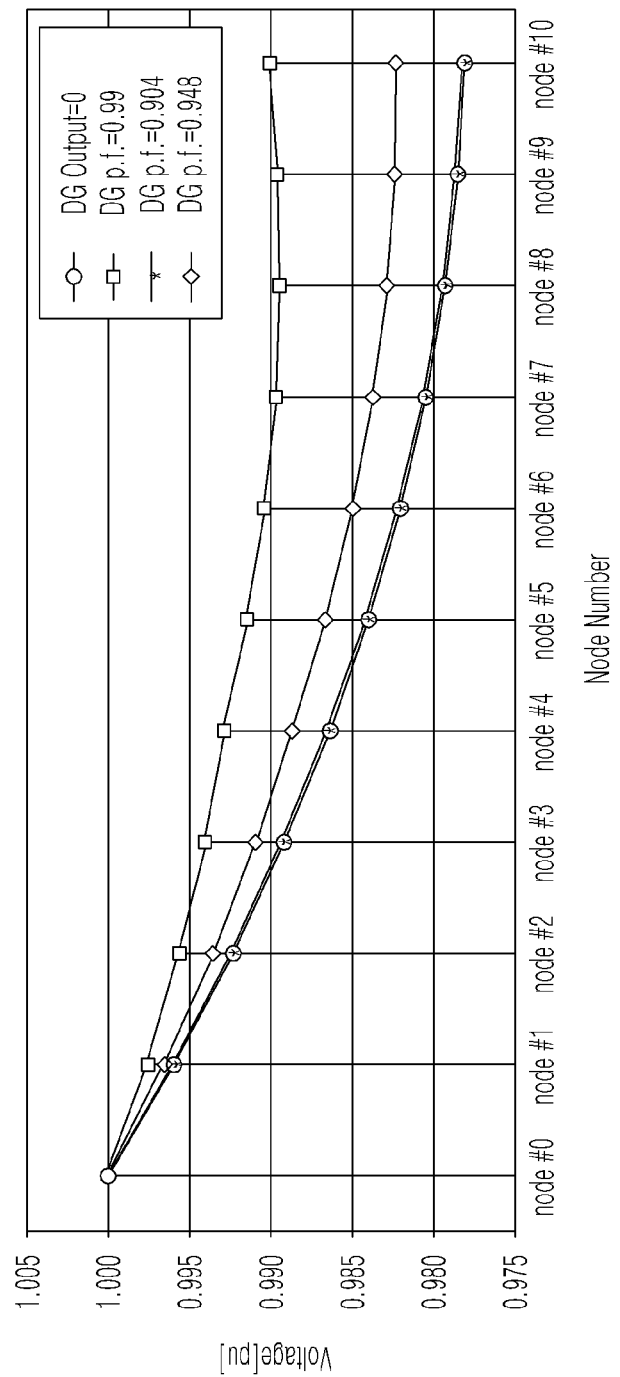
FIG. 10 is a view illustrating voltage distribution in a distribution line for each distributed generator power factor under the heavy-load condition (10 MVA and 1.0 pu) according to one embodiment of the present invention.
Figure 12:
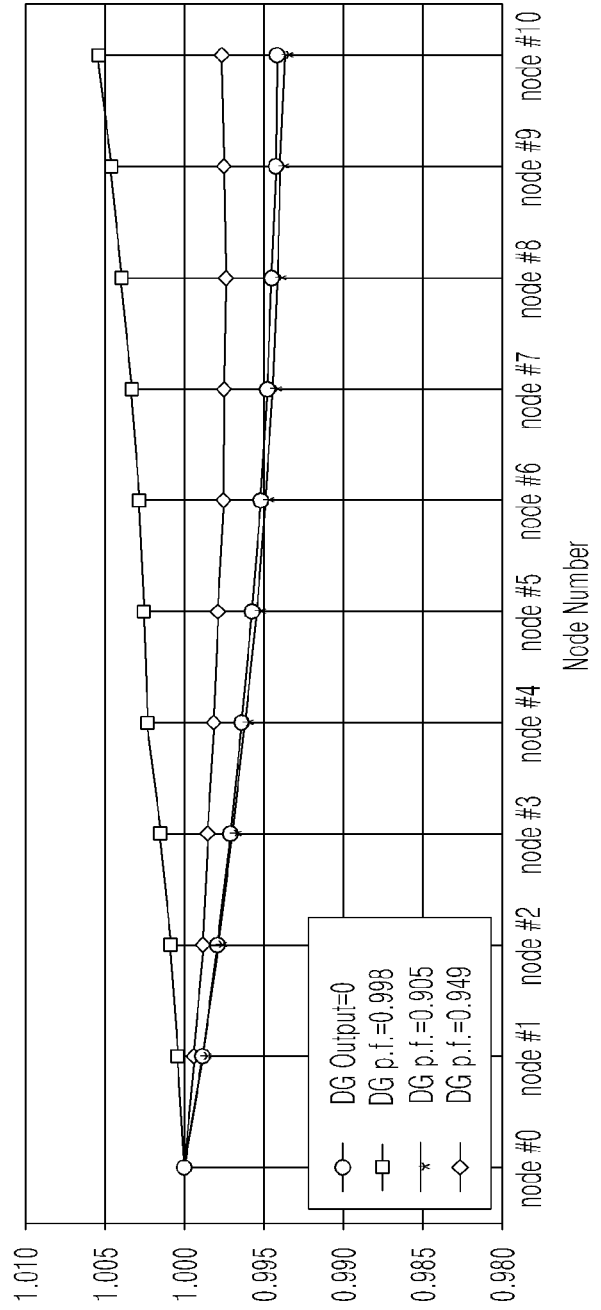
FIG. 12 is a view illustrating voltage distribution in a distribution line for each power factor of the distributed generator under a light-load condition (2.5 MVA and 0.25 pu) according to one embodiment of the present invention.

FIG. 8 is a view illustrating an example of a model power distribution system according to one embodiment of the present invention. FIG. 9 is a view illustrating a result of analyzing a model system simulation under a heavy-load condition (10 MVA and 1.0 pu) according to one embodiment of the present invention. FIG. 10 is a view illustrating voltage distribution in a distribution line for each distributed generator power factor under the heavy-load condition (10 MVA and 1.0 pu) according to one embodiment of the present invention. FIG. 11 is a view illustrating a result of analyzing a model system simulation under a light-load condition (2.5 MVA and 0.25 pu) according to one embodiment of the present invention. FIG. 12 is a view illustrating voltage distribution in a distribution line for each power factor of the distributed generator under a light-load condition (2.5 MVA and 0.25 pu) according to one embodiment of the present invention.

The result of changing a power factor condition of the distributed generator 30 of the distribution line model shown in FIG. 8 and analyzing the voltage distribution in the heavy-load state is shown in FIGS. 9 and 10. The result of analyzing in the light-load condition is shown in FIGS. 11 and 12.

Referring to FIGS. 9 to 12, there is no difference in voltage fluctuation rates in results of analyzing Case1 and Case2. Also, it may be known that there is barely a difference in voltage fluctuation rates at distributed generators DG1 and DG2. Accordingly, it may be known from the two analysis results that the same voltage distribution is shown regardless of a level of load and a capacity of the distributed generator 30.

Case1 is a voltage distribution state in which there is no output of the distributed generator 30, that is, a state before the distributed generator 30 is connected to the distribution line. Case2 is a state in which DG1 and DG2 are connected to the distribution line and generate with regular outputs, respectively.

Here, the respective distributed generators 30 operate with the power factor calculated using Equation 11. Case4 is a condition of operating with a power factor of 1. Case3 is a state to which a power factor condition between a power factor condition of Case2 and a power factor condition of Case4 is applied.

As shown in the result of analysis, it may be known that the power factor of the distributed generator 30 determined through Equation 11 provided to minimize a voltage fluctuation rate based on impedance properties of the distribution line and a voltage rise theory of a distribution system fundamentally minimizes a voltage fluctuation rate at the distribution system, thereby maximizing a capacity for connecting the distributed generator 30 to the distribution line.

Figure 13:
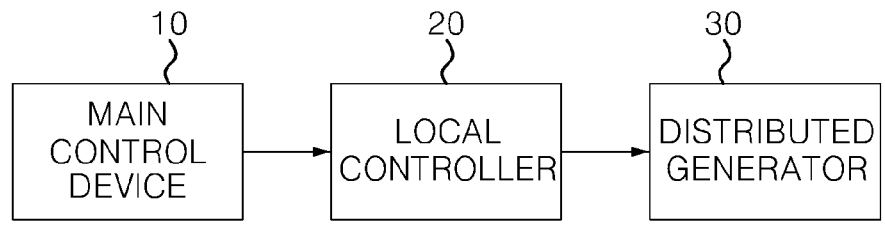
FIG. 13 is a block diagram illustrating an example of the apparatus for operating the distributed generator in connection with the power system according to one embodiment of the present invention.
Figure 14:
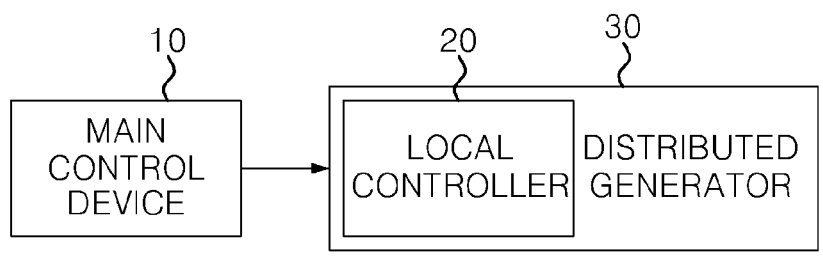
FIG. 14 is a block diagram illustrating another example of the apparatus for operating the distributed generator in connection with the power system according to one embodiment of the present invention.
Figure 15:
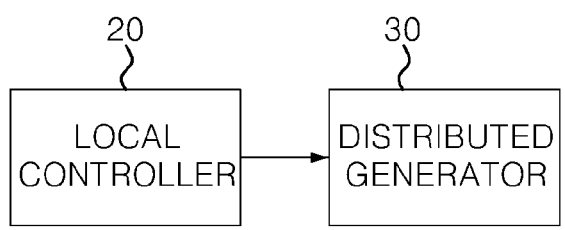
FIG. 15 is a block diagram illustrating still another example of the apparatus for operating the distributed generator in connection with the power system according to one embodiment of the present invention.
Figure 16:
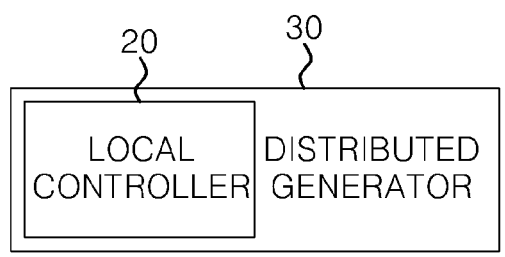
FIG. 16 is a block diagram illustrating yet another example of the apparatus for operating the distributed generator in connection with the power system according to one embodiment of the present invention.

FIG. 13 is a block diagram illustrating an example of the apparatus for operating the distributed generator in connection with the power system according to one embodiment of the present invention. FIG. 14 is a block diagram illustrating another example of the apparatus for operating the distributed generator in connection with the power system according to one embodiment of the present invention. FIG. 15 is a block diagram illustrating still another example of the apparatus for operating the distributed generator in connection with the power system according to one embodiment of the present invention. FIG. 16 is a block diagram illustrating yet another example of the apparatus for operating the distributed generator in connection with the power system according to one embodiment of the present invention.

In the embodiment described above, as shown in FIG. 13, the local controller 20 is separately configured from the distributed generator 30.

However, the technical scope of the present invention is not limited thereto. The local controller 20 may be variously installed inside or outside the distributed generator 30 depending on a generation amount of the distributed generator 30 and communication infrastructures.

Referring to FIG. 14, the local controller 20 may be installed inside the distributed generator 30 while being integrated with the distributed generator 30. In this case, related parameters are transmitted from the main control device 10 of the power system operating system that is an upper operating system to operate in connection.

In addition, the local controller 20 may operate being locally optimized without being connected to the upper operating system. In this case, since costs for communication infrastructures may be reduced, it is appropriate for conditions not equipped with communication infrastructures.

Also, when the local controller 20 is configured to be embedded in the distributed generator 30, it is possible to directly receive parameters from the main control device 10 of the power system operating system. When a plurality of such distributed generators 30 are installed and the power system operating system integrally manages the plurality of distributed generators 30, it is possible to obtain the same effects even when the local controller 20 is built in the main control device 10.

Additionally, it is necessary to operate only with a locally optimized solution, without connection with the power system operating system. That is, in a place with poor information communication infrastructures like a line in rural areas with low-level-loads unlike a downtown area lined with loads in a place connected with distributed generator, as shown in FIGS. 15 and 16, the local controller 20 may be separately configured from the main control device 10 or may be built in the distributed generator 30. In this case, it is applicable without support of information communication infrastructures, thereby being directly applied to a present operating condition.

While one or more embodiments of the present invention have been described with reference to the figures, which are merely examples, it will be understood by those of ordinary skill in the art that various changes in form and details may be made therein.

Therefore, the substantial technical protection scope of the present invention should be determined according to the following claims.

The invention claimed is:

1. An apparatus for operating a distributed generator in connection with a power system, comprising:
an input unit which receives a parameter calculated using power system information and a voltage and a current at a point of common coupling with the distributed generator, with which the distributed generator is connected;
a calculation unit which calculates an operating power factor instruction value and an active output instruction value using the parameter and the voltage and current at the point of common coupling with the distributed generator input to the input unit;
a control communication unit which determines and transmits the operating power factor instruction value and the active output instruction value according to the voltage at the point of common coupling with the distributed generator input to the input unit and an admissible voltage upper limit at the point of common coupling with the distributed generator to the distributed generator,
wherein active power and reactive power are generated by the distributed generator according to the transmitted operating power factor instruction value and active output instruction value, and
the operating power factor instruction value is a ratio of the active output to a reactive output of the distributed generator, which divides a line impedance corresponding to a section from the point of common coupling with the distributed generator to the substation into a resistance component and a reactance component and allows a voltage rise portion caused by an active output and the resistance component to be identical to a voltage drop portion caused by the reactive output and the reactance component.

2. The apparatus of claim 1, wherein the control communication unit determines the active output instruction value as an allowable active power generation amount of the distributed generator when the voltage at the point of common coupling with the distributed generator input to the input unit exceeds the admissible voltage upper limit at the point of common coupling with the distributed generator.

3. The apparatus of claim 1, wherein the control communication unit determines the active output instruction value as a preset first set value when the voltage at the point of common coupling with the distributed generator input to the input unit is the admissible voltage upper limit at the point of common coupling with the distributed generator or less.

4. The apparatus of claim 3, wherein the control communication unit compares a present instantaneous active power output amount of the distributed generator with a regular optimal active power generation amount and determines the operating power factor instruction value according to a comparison result when the voltage at the point of common coupling with the distributed generator input to the input unit is the admissible voltage upper limit at the point of common coupling with the distributed generator or less.

5. The apparatus of claim 4, wherein the control communication unit determines the operating power factor instruction value as a second set value when the present instantaneous active power output amount is the regular optimal active power generation amount or less.

6. The apparatus of claim 4, wherein the control communication unit calculates the operating power factor instruction value to compensate a voltage rise portion at the point of common coupling with the distributed generator with a voltage drop portion caused by a reactive output when the present instantaneous active power output amount exceeds the regular optimal active power generation amount.

7. An apparatus for operating a distributed generator in connection with a power system, comprising:
a main control device which calculates active power of the distributed generator and a parameter with respect to an interconnection line using power system information;

a local controller which calculates an operating power factor instruction value of the distributed generator and an active output instruction value of the distributed generator using the parameter calculated at the main control device and a voltage and a current at a point of common coupling with the distributed generator in which the distributed generator is connected to a distribution system; and the distributed generator which generates the active power and reactive power according to the operating power factor instruction value and the active output instruction value calculated at the local controller, wherein the operating power factor instruction value is a ratio of the active output to a reactive output of the distributed generator, which divides a line impedance corresponding to a section from the point of common coupling with the distributed generator to the substation into a resistance component and a reactance component and allows a voltage rise portion caused by an active output and the resistance component to be identical to a voltage drop portion caused by the reactive output and the reactance component.

8. The apparatus of claim 7, wherein the parameter comprises a voltage upper limit minimum voltage margin at the point of common coupling with the distributed generator, an allowable active power generation amount of the distributed generator, a regular optimal active power generation amount of the distributed generator, and a line impedance of the point of common coupling with the distributed generator.

9. The apparatus of claim 7, wherein the local controller comprises:
an input unit which receives and stores the parameter from the main control device and the voltage and current at the point of common coupling;
a calculation unit which calculates the operating power factor instruction value and the active output instruction value using the parameter and the voltage and current at the point of common coupling with the distributed generator stored in the input unit; and
a control communication unit which determines and transmits the operation power factor instruction value and the active output instruction value calculated by the calculation unit according to the voltage of the input unit and an admissible voltage upper limit at the point of common coupling with the distributed generator to the distributed generator.

10. The apparatus of claim 7, wherein the distributed generator comprises:
a distributed generator calculation unit which receives the operating power factor instruction value and the active output instruction value from the local controller and calculates an active power target value and a reactive power target value;
an operating unit which adjusts the active power target value and the reactive power target value received from the distributed generator control unit;
a generating unit which generates according to the active power target value and the reactive power target value adjusted by the operating unit and outputs the active power and reactive power; and
a distributed generator control unit which monitors the active power and the reactive power output from the generating unit and inputs a maximum output operating condition to the distributed generator control unit according to an operating state.

11. The apparatus of claim 10, wherein the distributed generator control unit controls to output the active power and the reactive power with an optimal operating condition when the operating power factor instruction value input from the local controller is a second set value and the active output instruction value is a first set value.

12. The apparatus of claim 10, wherein when the active output instruction value is set as a first set value and the operating power factor instruction value is not set as a second set value, the distributed generator control unit limits an operation to the allowable active power generation amount or operates with the operating power factor instruction value depending on whether the generating unit is operable with the operating power factor instruction value.

13. The apparatus of claim 10, wherein when the active output instruction value is not set as a first set value, the distributed generator control unit operates while limiting an active output according to the allowable active power generation amount.

14. A method of operating a distributed generator in connection with a power system, comprising:
calculating a line impedance corresponding to a section from a point of common coupling with the distributed generator, at which the distributed generator is connected to the power system, to a substation;
calculating a distributed generator operating power factor which restrains voltage fluctuations at the point of common coupling with the distributed generator using the line impedance, an active output of the distributed generator, and a reactive output of the distributed generator; and
operating the distributed generator according to the distributed generator operating power factor,
wherein the distributed generator operating power factor is a ratio of the active output of the distributed generator and the reactive output of the distributed generator, which allows a voltage rise portion caused by the active output of the distributed generator and a resistance component of the line impedance to be identical to a voltage drop portion caused by the reactive output of the distributed generator and a reactance component of the line impedance.

15. The method of claim 14, wherein the operating of the distributed generator comprises compensating a voltage rise portion at the point of common coupling with the distributed generator with a voltage drop portion at the point of common coupling with the distributed generator.

* * * * *